United States Patent
Paul et al.

(10) Patent No.: US 9,619,254 B2
(45) Date of Patent: *Apr. 11, 2017

(54) ADAPTIVE ARCHITECTURE FOR A MOBILE APPLICATION BASED ON RICH APPLICATION, PROCESS, AND RESOURCE CONTEXTS AND DEPLOYED IN RESOURCE CONSTRAINED ENVIRONMENTS

(71) Applicant: Accenture Global Services Limited, Dublin (IE)

(72) Inventors: Sanjoy Paul, Kolkata (IN); Vikrant S. Kaulgud, Pune (IN); Venkatesh Subramanian, Bangalore East (IN); Nataraj Kuntagod, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,472

(22) Filed: Nov. 24, 2015

(65) Prior Publication Data
US 2016/0077879 A1    Mar. 17, 2016

Related U.S. Application Data

(63) Continuation of application No. 13/616,334, filed on Sep. 14, 2012, now Pat. No. 9,207,957.

(30) Foreign Application Priority Data

Apr. 6, 2012    (IN) .......................... 1390/CHE/2012

(51) Int. Cl.
*G06F 9/44* (2006.01)
*G06F 9/46* (2006.01)
(Continued)

(52) U.S. Cl.
CPC ...... *G06F 9/44552* (2013.01); *G06F 9/44505* (2013.01); *G06F 9/48* (2013.01);
(Continued)

(58) Field of Classification Search
None
See application file for complete search history.

(56) References Cited

U.S. PATENT DOCUMENTS 9,207,957 B2    12/2015  Paul et al.
2005/0188074 A1*  8/2005  Voruganti ............... H04L 69/12
                                                    709/224
(Continued)

OTHER PUBLICATIONS

Cuervo Eduardo, "MAUI: Making Smartphones Last Longer with Code Offloading", Jun. 2010, ACM.*
(Continued)

*Primary Examiner* — Lewis A Bullock, Jr.
*Assistant Examiner* — Mark Gooray
(74) *Attorney, Agent, or Firm* — Harrity & Harrity, LLP

(57) ABSTRACT

A method for adapting execution of an application on a mobile device may be performed by a mobile device including a processor and a memory. The method may include receiving an application context, a process context, and one other context. The method also includes analyzing at least one of the application context or the process context together with the one other context. The method also includes dynamically adapting execution of the application on the mobile device based on the analysis. Adapting execution of the application may include transferring processing related to the application to a backend server for processing.

20 Claims, 10 Drawing Sheets

(51) Int. Cl.
  *G06F 9/445* (2006.01)
  *G06F 9/48* (2006.01)
  *G06F 9/50* (2006.01)

(52) U.S. Cl.
  CPC .............. *G06F 9/4881* (2013.01); *G06F 9/50* (2013.01); *G06F 9/5005* (2013.01); *G06F 9/5061* (2013.01); *Y02B 60/185* (2013.01)

(56) References Cited

U.S. PATENT DOCUMENTS

2006/0005156 A1   1/2006   Korpipaa et al.
2009/0158239 A1   6/2009   McColgan et al.

OTHER PUBLICATIONS

Xiaohui Gu et al., "Adaptive Offloading Inference for Delivering Applications in Pervasive Computing Environments", IEEE, 2003.
Xiaohui Gu et al., "Adaptive Offloading for Pervasive Computing", IEEE, 2004.
Byung-Gon Chun et al., "Clone Cloud: Elastic Execution between Mobile Device and Cloud", ACM, Apr. 2011.
Denis Conan et al., "Scalable Processing of Context Information with COSMOS", $7^{th}$ IFIP International Conference on Distributed Applications and Interoperable Systems, Jun. 2007.

\* cited by examiner

| Context category | Context | Type | Capture method |
|---|---|---|---|
| Process | | | |
| | Role availability | Dynamic | Feed |
| | Role-specific constraints | Dynamic | Feed |
| | Diagnostic confidence | Dynamic | Application Output |
| Application objective | | | |
| | Diagnosis | | User Intent Configuration or Application Preset |
| | Diagnosis confirmation | | User Intent Configuration or Application Preset |
| | Consultation | | User Intent Configuration or Application Preset |
| | Emergency | | User Intent Configuration or Application Preset |
| | Application objective tradeoff | | User Intent Configuration or Application Preset |
| Service Infrastructure | | | |
| | Intermediate node availability | Dynamic | Feed / Keep Alive Message |
| | Time-since-last-sync-to-PHC | Dynamic | Application Monitoring and Configuration |
| | Time-since-last-sync-to-rules | Dynamic | Application Monitoring and Configuration |
| Edge mobility | | | |
| | Mostly roaming sometimes static | Static | Deployment Configuration |
| | Mostly stationary sometimes roaming | Static | Deployment Configuration |
| | Roaming only | Static | Deployment Configuration |
| | Stationary only | Static | Deployment Configuration |
| Device | | | |
| | Battery | Dynamic | Device API |
| | Form factor | Static | Device API |
| | CPU | Dynamic | Device API |
| | Audio capability | Static | Device API |
| | Video capability | Static | Device API |
| | Device type | Static | Application deployment confriguration |
| Network Infrastructure | | | |
| | Network availability | Dynamic | Device API |
| | Network connection type | Dynamic | Device API |

Fig. 3

| Adaptation Trigger Type | Context Processing Rule | Adaptation Decision |
|---|---|---|
| 510 Collaboration channel selection | network-availability=true AND network-conn-type='EDGE' AND application-objective='Consultation' AND doctor-availability=true | setup audio-chat session |
| 520 Resource Conservation | application-objective='diagnosis' | terminate all network connections |
| | battery-availability <30% AND application-objective='consultation' | override application-objective and set it to diagnosis |
| | battery-availability <50% | throttle CPU to 700MHZ |
| | trade-off='community-coverage' AND battery-availability < 70% AND application-objective != 'emergency' | terminate 3G/WiFI AND disable video-conf features |
| 530 Diagnostic confidence | diagnosis-probability < 60% AND network-availability=true AND network-conn-type='EDGE' | send symptom and context data to online diagnostic server and initiate diagnosis job |
| 540 Application configuration | video-capability=false | disable video-conferencing features in application |
| 550 Infrastructure Interaction | network-availability=true AND network-conn-type='EDGE' AND battery-availability> 70% AND time-since-last-sync-of-rules > 1 week | Trigger sync with iDOC server and fetch new rules |
| | Device-type=j2me | Enable on data collection in application and push remaining functionality to the backend |
| 560 High Availability/Graceful Degradation | Battery-availability < 20% AND network-availability=true AND long-running-transaction=true | Copy checkpoint of code and data to backend server to resume transaction |

Fig. 5

ADAPTIVE ARCHITECTURE FOR A MOBILE APPLICATION BASED ON RICH APPLICATION, PROCESS, AND RESOURCE CONTEXTS AND DEPLOYED IN RESOURCE CONSTRAINED ENVIRONMENTS

RELATED APPLICATIONS

This application is a continuation of U.S. patent application Ser. No. 13/616,334, filed Sep. 14, 2012 (now U.S. Pat. No. 9,207,957), which is related to and claims the benefit of priority from India Application No. 1390/CHE/2012, the disclosures of which are hereby incorporated by reference.

FIELD OF THE DISCLOSURE

This disclosure is directed to systems and methods for adapting the execution of applications on mobile devices and, more particularly, to systems, methods, and computer programs embodied on non-transitory computer-readable media for an adaptive architecture for a mobile application based on rich application, process, and resource contexts and deployed in resource-constrained environments.

BACKGROUND

Mobile devices such as smart phones are rapidly evolving and maturing as a platform that serves the computational and communication needs of people in their everyday lives. The near ubiquitous use of mobile phones and the high penetration of mobile networks into urban and rural areas have made mobile phones a suitable platform for delivering applications such as primary healthcare, agriculture support, etc. to rural populations. Additionally, a growing number of smart phones have embedded sensors which can sense the user's environment. For example, many smart phones come with built in accelerometers, GPS, light sensors, microphones, proximity sensors, cameras, compasses, and gyroscopes. There are also many sensors available that can communicate over low power RF communication and push data to phones.

These sensors allow the mobile device to determine a context based on the inputs from the sensors. Conventional proactive applications, such as location-based tracking, healthcare, remote monitoring, or environmental monitoring may use the context derived from the sensors. The conventionally derived context may be aware of external conditions through the sensors. However, conventionally derived contexts may not be cognizant of the application objectives, operating environment constraints, process requirements, and other contexts internal to the device.

In order to provide an enhanced quality of user experience, and to meet service requirements, it may be desirable for mobile applications to be aware of application contexts and process contexts, as well as tradeoffs. Such a rich context may allow the mobile device to utilize its limited resources more effectively and provide a better user experience.

Specifically, mobile devices typically have limited processing power and other resources. Despite the limited resources of mobile devices, users frequently run or attempt to run lengthy or complex applications, or a large number of applications, in the resource-constrained mobile device environment. Such high demands on the limited resources of the mobile device may cause application execution to slow or stop, which is undesirable for the user experience. This may be especially troublesome when certain applications are critical applications, because the critical applications may be similarly slowed or stopped when the limited resources of the mobile device are strained.

Accordingly, it is desirable to provide an adaptive architecture for a mobile application based on rich application, process, and resource contexts that may be deployed in a resource constrained environment. The adaptive architecture may provide for offloading certain processes based on an analysis of a rich context provided to the mobile device. The adaptive architecture may also provide for other adaptations to the mobile device or to application execution on the mobile device. The adaptations may be performed dynamically.

Accordingly, systems, methods and computer programs embodied on non-transitory computer-readable media are provided for an adaptive architecture for a mobile application based on rich application, process, and resource contexts that may be deployed in a resource-constrained environment, as disclosed herein.

SUMMARY

Consistent with the disclosure, embodiments of systems and methods for an adaptive architecture for a mobile application based on rich application, process, and resource contexts and deployed in resource constrained environments are disclosed.

According to one embodiment, a method for adapting execution of an application on a mobile device is disclosed. The mobile device may include a processor and a memory. The method may include receiving, by the processor, an application context, a process context, and at least one other context; analyzing, by the processor, at least one of the application context or the process context together with the at least one other context; and based on the analysis, adapting execution of the application on the mobile device.

In one embodiment, adapting execution of the application may include transferring processing related to the application to a backend server for processing.

In another embodiment, transferring processing related to the application to the backend server may include copying a checkpoint of executable code; sending the checkpoint to the backend server; and resuming processing at the backend server based on the checkpoint.

The method may further include receiving, by the processor, data from sensors; and processing the data to generate one of the application context, the process context, or the at least one other context.

In one embodiment, the analyzing may include generating adaptation decisions based on the at least one of the application context or the process context together with the at least one other context; and generating adaptation triggers based on the adaptation decisions. The adaptation triggers may trigger the adapting execution of the application on the mobile device.

In another embodiment, the adaptation decisions may be generated based on context processing rules that include conflict rules based on a priority framework.

In another embodiment, the adaptation decisions may include a capability-limiting tag. The method may also include suppressing an adaptation decision when the capability-limiting tag of the adaptation decision indicates that the adaptation decision is capability-limiting.

The method may also include receiving, by the processor, tradeoff rules between the adaptation decisions. The adaptation triggers may be generated based on the adaptation decisions and tradeoff rules.

In one embodiment, adapting execution of the application may include enabling or disabling peripherals of the mobile device.

In one embodiment, the application may be a healthcare application.

According to another embodiment, a system for adapting execution of an application is disclosed. The system may include a mobile device running the application, the mobile device including a processor and a memory; and sensors that provide data to the mobile device. The mobile device may be configured to receive an application context, a process context, and at least one other context; analyze at least one of the application context or the process context together with the at least one other context; and based on the analysis, adapt execution of the application on the mobile device.

In one embodiment, the system may also include a network; and a server communicably connected to the mobile device through the network. The mobile device may also be configured to dynamically adapt execution of the application by transferring processing related to the application to the backend server for processing.

In one embodiment, the server may be part of the cloud.

In another embodiment, the mobile device may also be configured to analyze by generating adaptation decisions based on the at least one of the application context or the process context together with the at least one other context; and generating adaptation triggers based on the adaptation decisions. The adaptation triggers may trigger the adapting execution of the application on the mobile device.

In one embodiment, the adaptation decisions may be generated based on context processing rules that include conflict rules based on a priority framework.

In another embodiment, the adaptation decisions may include a capability-limiting tag, and the mobile device may also be configured to suppress an adaptation decision when the capability-limiting tag of the adaptation decision indicates that the adaptation decision is capability-limiting.

In another embodiment, the mobile device may also be configured to adapt execution of the application by enabling or disabling peripherals of the mobile device.

According to another embodiment, a non-transitory computer-readable storage medium may store instructions which, when executed by a processor, cause the processor to perform a method for adapting execution of an application on a mobile device. The method may include receiving an application context, a process context, and at least one other context; analyzing at least one of the application context or the process context together with the at least one other context; and based on the analysis, adapting execution of the application on the mobile device.

In one embodiment, adapting execution of the application may include transferring processing related to the application to a backend server for processing.

In another embodiment, the analyzing may include generating adaptation decisions based on (1) the at least one of the application context or the process context together with the at least one other context and (2) context processing rules that include conflict rules based on a priority framework; and generating adaptation triggers based on the adaptation decisions. The adaptation triggers may trigger the adapting execution of the application on the mobile device.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the embodiments of the disclosure.

BRIEF DESCRIPTION OF THE DRAWINGS

FIG. 3 is a chart illustrating different types of context that may be provided according to embodiments of the disclosure.

FIG. 5 is an exemplary chart illustrating different adaptation triggers according to embodiments of the disclosure.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Figure 1:
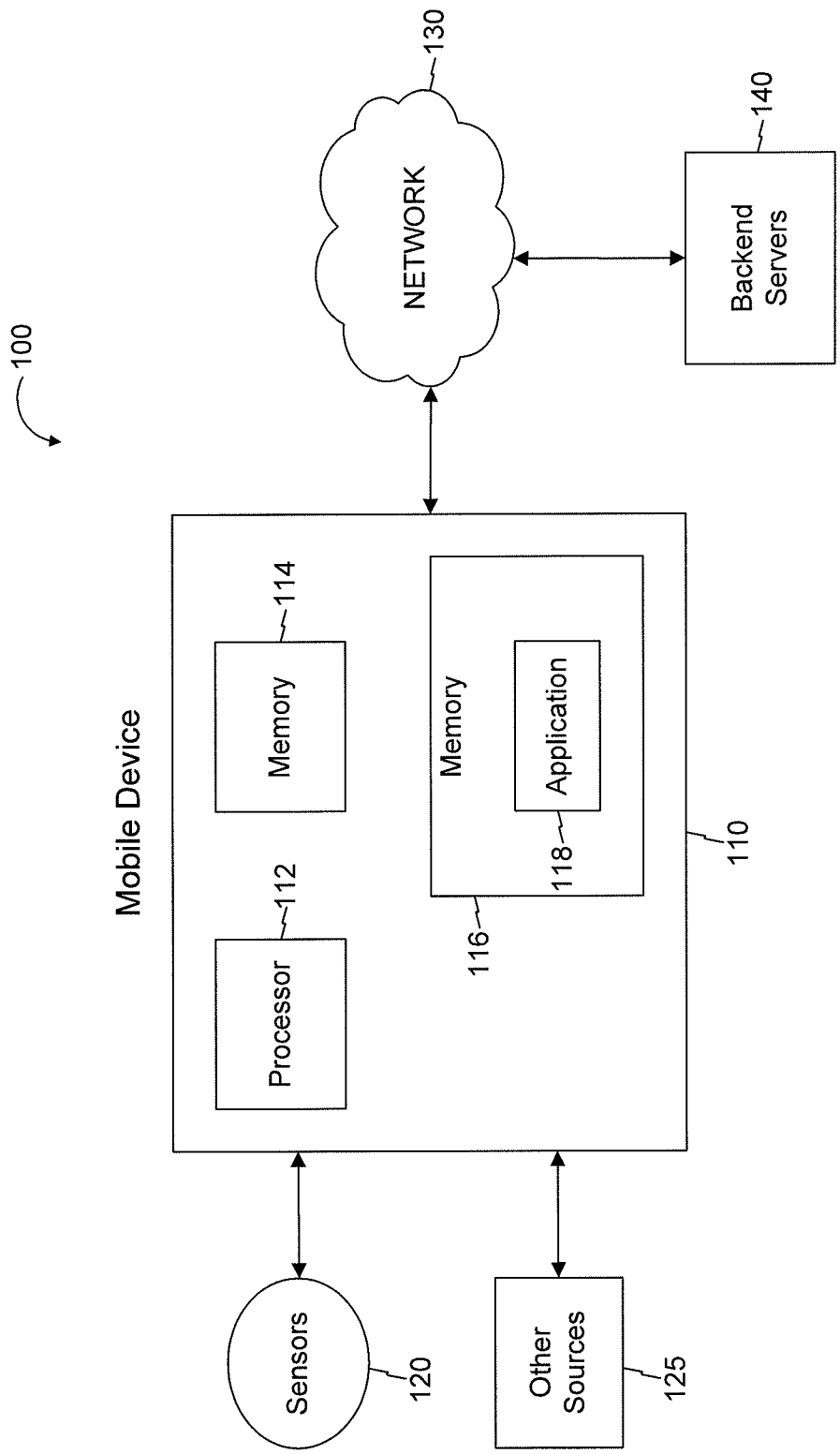
FIG. 1 is an illustration of an overview of an exemplary system according to embodiments of the disclosure.

FIG. 1 illustrates an overview of an exemplary system 100 for an adaptive architecture for a mobile application based on rich application, process, and resource contexts that may be deployed in resource-constrained environments. In the exemplary system 100, a mobile device running an application may receive different contexts including an application context and a process context, and based on the application context and the process context, execution of the application may dynamically adapt.

The system 100 may be divided into three portions: a frontend represented by the mobile device 110, a network 130, and a backend 140 including backend servers. The system may also include sensors 120 in communication with the mobile device 110. The system may also include other sources 125. The mobile device 110 may be, for example, a cell phone, personal digital assistant (PDA), tablet, laptop, part of an on-board vehicle electronic system, or other portable computing device.

The mobile device 110 may include a processor 112. The processor 112 may include one or more known processing devices such as a microprocessor. The mobile device 110 may include one or more memory devices 114 and 116. The memory 114 and 116 may include one or more storage devices configured to store information used by the processor 112 to perform functions of the mobile device including functions related to disclosed embodiments. The memory 114 and 116 may include volatile or non-volatile, magnetic, semiconductor, tape, optical, removable, non-removable, or other types of computer-readable media used as a storage device. The memory 114 and 116 may include one or more programs that may be loaded and executed by the processor 112 to perform various procedures, operations, or processes consistent with disclosed embodiments.

As illustrated in FIG. 1, the memory 116 may include an application 118 stored thereon. The application 118 may be loaded and executed by the processor 112. The application 118 may be one of numerous commercially available applications, or may be a custom application. More than one application 118 may be running on the mobile device at any time.

The sensors 120 may be any of presently known or commercially available sensors that perform measurements and output results of the measurements. As a non-limiting and non-exhaustive exemplary list, the sensors 120 may include cameras, microphones, gyroscopes, accelerometers, heart rate monitors, or blood pressure monitors, as well as other sensors that measure light, sound, temperature, location, pressure, time, distance, speed, or other physical quantities. The system 100 may also incorporate newly developed sensors. The sensors 120 may be physically integrated into the mobile device 110, or may be separate from the mobile device 110 and may communicate with the mobile device through wired and/or wireless communication means.

The system may also include other sources 125 that provide information to the mobile device 110. For example, in a mobile healthcare application, the other sources 125 may include results from a blood test or an x-ray report, or other reports. These results may not be available to the mobile device 110 through sensors or other means, but may be input separate from other inputs to the mobile device 110. For example, the information from the other sources 125 may be input manually into the mobile device 110, or may be loaded from an external database storing the information. In one embodiment, the mobile device 110 may be connected to or in communication with a device that performs blood testing or other medical testing. In another embodiment, the results of such testing may be stored in a database by another source 125, and the mobile device 110 may access the database to receive the information from this other source. The information from the other sources 125 may be used by the mobile device 110 when making adaptation decisions.

The network 130 may be any known network, for example, the internet. The network 130 may facilitate communication from the mobile device 110 to the backend servers 140 through a communication link that may be a direct communication link, a LAN, a WAN, or other suitable connection.

The backend 140 may include one or more servers. The servers may be general-purpose servers, or may be dedicated servers for the mobile device 110 or the application 118 running on the mobile device. The backend 140 may also be embodied in the cloud. If the backend 140 is the cloud, the mobile device 110 may communicate with servers or other hardware or software components in the cloud through the network 130.

In operation, the mobile device 110 of the system 100 may be running one or more applications 118. The mobile device 110 may receive data from the sensors 120. The mobile device 110 may include a context manager that may be embodied as software stored in a computer-readable, non-transitory storage medium such as memory 114 or 116, which when executed by the processor 112, causes the processor 112 and storage medium to operate as a context manager that outputs context based on the sensor inputs. In addition to the basic context provided by the context manager from the sensor inputs, the mobile device 110 may also generate or receive an application context and a process context. The mobile device 110 may combine the basic context and one or more of the application context and the process context to derive a rich context. Based on the rich context, the execution of the application 118 on the mobile device 110 may be adapted. Adapting of the execution of the application 118 may include transferring a portion or all of the processing to the backend 140 from the mobile device 110. That is, based on the rich context, the mobile device 110 may shift part of the processing load of the application 118 to the backend 140. This shifting of the processing load may be especially beneficial when the application is running in a resource-constrained environment such as the mobile device 110. Shifting the processing may free up processing power of the mobile device 110 for other applications or to save battery power, and may allow the backend servers 140 to more quickly perform the processing based on their relatively greater processing power, speed and capacity. In some embodiments, the processing required by the application 118 may be sufficiently complex that the mobile device 110 may be capable of performing only preliminary processing, and the backend servers 140 may be required for the complete processing should the complete processing be desired.

Figure 2:
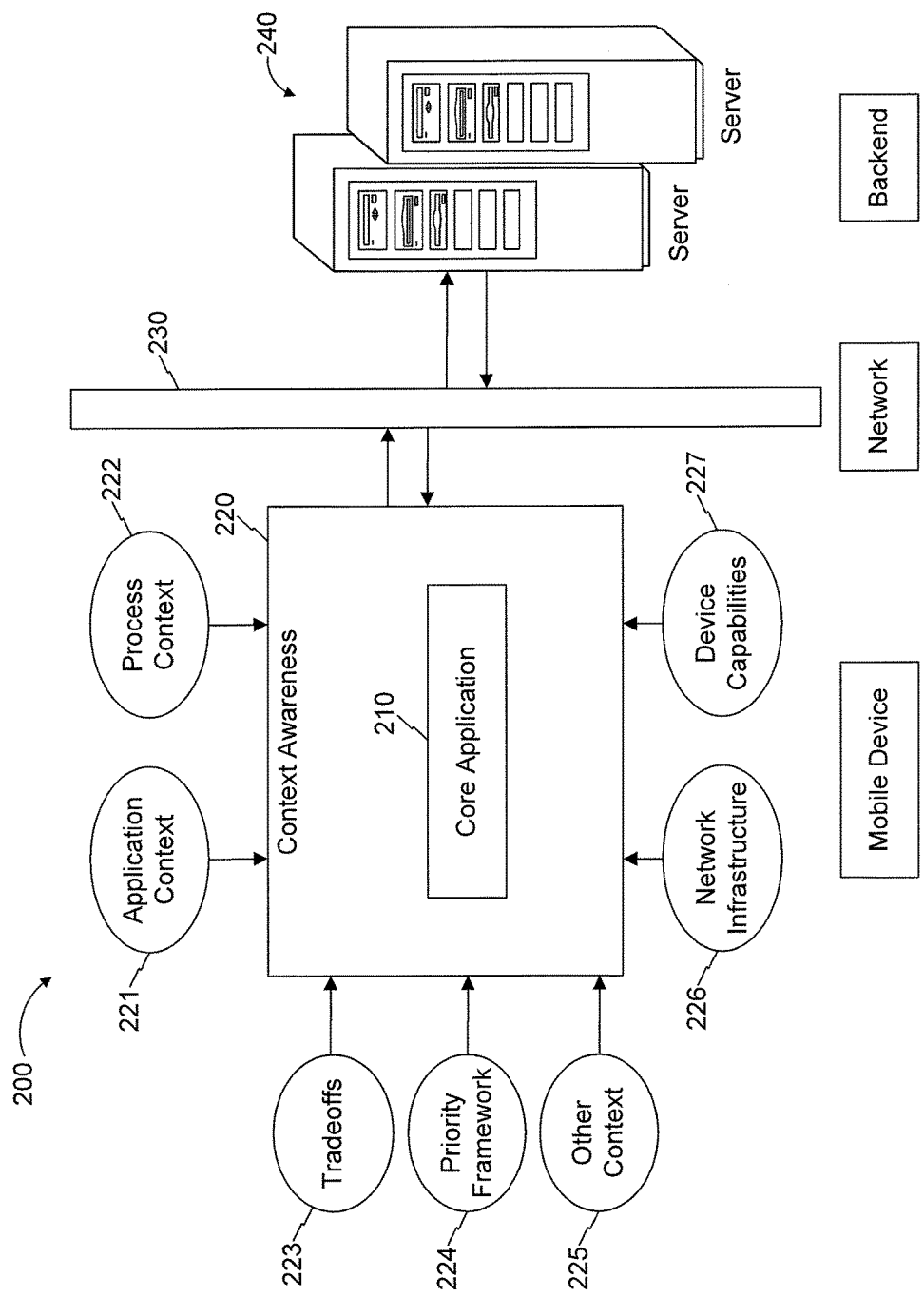
FIG. 2 is an illustration of an overview of an exemplary system according to embodiments of the disclosure.

FIG. 2 illustrates an overview of a system 200 for an adaptive architecture for a mobile application based on rich application, process, and resource contexts that may be deployed in resource constrained environments.

The system 200 may be divided into three portions, similar to the system 100. The system 200 may include a frontend represented by the mobile device, a network 230, and a backend represented by servers 240. A core application 210 may be running on the mobile device. The core application 210 may be any one of numerous commercially available applications, or may be a custom application. For example, the core application 210 may be a mobile healthcare application, a network soldier application, a traffic monitoring application, a resource conservation application, or an entertainment related application.

A context awareness layer 220 may be wrapped around the core application 210. The context awareness layer 220 may provide context awareness to the core application 210 by receiving context and other data, and by processing, analyzing, and interpreting the context and other data to provide context awareness to the core application 210.

The contexts and other data received by the context awareness layer 220 may include an application context 221, a process context 222, tradeoffs 223, a priority framework 224, other context 225, network infrastructure information 226, and device capabilities 227, as well as other information that may be desirable for the particular core application 210 running on the mobile device. The combination of the application context 221 and the process context 222 with the other context 225 creates a context that is richer than conventionally used contexts in mobile devices.

Examples of these contexts and other data may be described with respect to a mobile healthcare application ("healthcare app") as the core application 210. The healthcare app may be, for example, any of commercially available healthcare applications, customized healthcare applications, or later developed healthcare applications for use on smart phones and other mobile devices. The healthcare app may include a diagnosis capability or function for diagnosing a patient based on symptoms entered by a user and/or detected by the mobile device. When the healthcare app is running a diagnosis, the application context 221 may be "diagnosis", signifying that the context in which the application is running is a diagnosis. More generally, the application context 221 is the context of the application or applications running on the mobile device.

As part of the diagnosis, the healthcare app or mobile device may determine a diagnostic confidence that represents the confidence level that the diagnosis is accurate. For example, if the information about the symptoms provided to or gathered by the mobile device are lacking, the diagnostic confidence may be low. In this example, the process context 222 may be "diagnostic confidence" because that is the context of the process running in the healthcare app. More generally, the process context 222 is the context of the process that is running on the mobile device.

In one embodiment, the mobile device may be operating applications in a combat field. One application may include an application to take pictures and match targets in the pictures to pre-defined targets. A process within the application may include performing image processing of a photograph that is taken. The process may generate a quality score for the photograph, which may be used to determine whether image processing should be performed locally on the mobile device, or sent to a backend server for processing. A process context for this process may be the quality score, and may include "poor image quality," "good image quality," or other quality scores. In one embodiment, when the process context is "poor image quality," processing may be shifted to the backend server.

The tradeoffs 223 represent tradeoffs that the system 200 will encounter based on decisions that are made and actions that are taken. For example, if the application context 221 is "emergency" and the application determines that wireless communication is required, the tradeoffs 223 may indicate that the emergency should have priority over a resource conservation application that may have turned off wireless communication to conserve battery power.

The tradeoffs 223 may be provided separately to the system 200, or may be included in the priority framework 224. The priority framework 224 may include conflict rules, capability-limiting tags, tradeoffs, and other information that may define a priority framework for applications, processes, and decisions on the mobile device.

The other context 225 may include contexts derived from sensors in communication with the mobile device. For example, the mobile device may include a camera and may be in communication with a temperature sensor. A context manager may receive data based on the outputs of the camera and temperature sensor, and provide one or more contexts to the context awareness layer 220. These contexts may be part of the other context 225.

In one embodiment, the other context 225 may include other external inputs. For example, in a mobile healthcare application, the other context 225 may include blood test results, an x-ray report, a biopsy report, or an MRI report, among other inputs. These external inputs may be input separate from other inputs to the mobile device. For example, the information may be input manually into the mobile device, or may be loaded from an external database storing the information.

The network infrastructure information 226 may include information about the network infrastructure such as the type (EDGE, 3G, 4G, GSM, GPRS, etc.) and availability of the mobile communication network. The device capabilities 227 may include information about the mobile device such as processor type and speed, operating system, available memory, video and audio capabilities, etc.

The context awareness layer 220 (or the mobile device more generally) may communicate with the backend servers 240 by means of a network 230. The network 230 may include the internet, a wired or wireless LAN, a mobile communication network, or any other suitable network.

The servers 240 may include general-purpose computers, application specific servers, servers located in the cloud, or the cloud generally. That is, the context awareness layer 220 (or the mobile device more generally) may communicate with specific servers 240, or may communicate with servers in the cloud without knowing which specific servers are being utilized.

The servers 240 may also communicate with the context awareness layer 220 (or the mobile device more generally) by means of the network 230. The servers 240 may perform calculations or processing as directed by the mobile device, and may return results of the calculations or processing.

FIG. 3 is a chart 300 illustrating different types of context that may be provided to the context awareness layer 220. The types of contexts and context details in FIG. 3 are derived from a healthcare application that may be run on the mobile device. The chart 300 includes columns for the context category or type of context, the context or actual context within the context category, the type of context, and the capture method of the context.

A process context 310 may include contexts such as "role availability", role-specific constraints", and "diagnostic confidence". An application objective context 320 or application context may include contexts such as "diagnosis", "diagnosis confirmation", "consultation", "emergency", and "application objective tradeoff". A service infrastructure context 330 may include contexts such as "intermediate node availability", "time-since-last-sync-to-PHC", and "time-since-last-sync-of-rules". An edge mobility context 340 for the mobile device may include contexts such as "mostly roaming sometimes static", "mostly stationary sometimes roaming", "roaming only", and "stationary only". A device context 350 may include contexts such as "battery", "form factor", "CPU", "audio capability", "video capability", and "device type". A network infrastructure context 360 may include contexts such as "network availability" and "network connection type".

Figure 4:
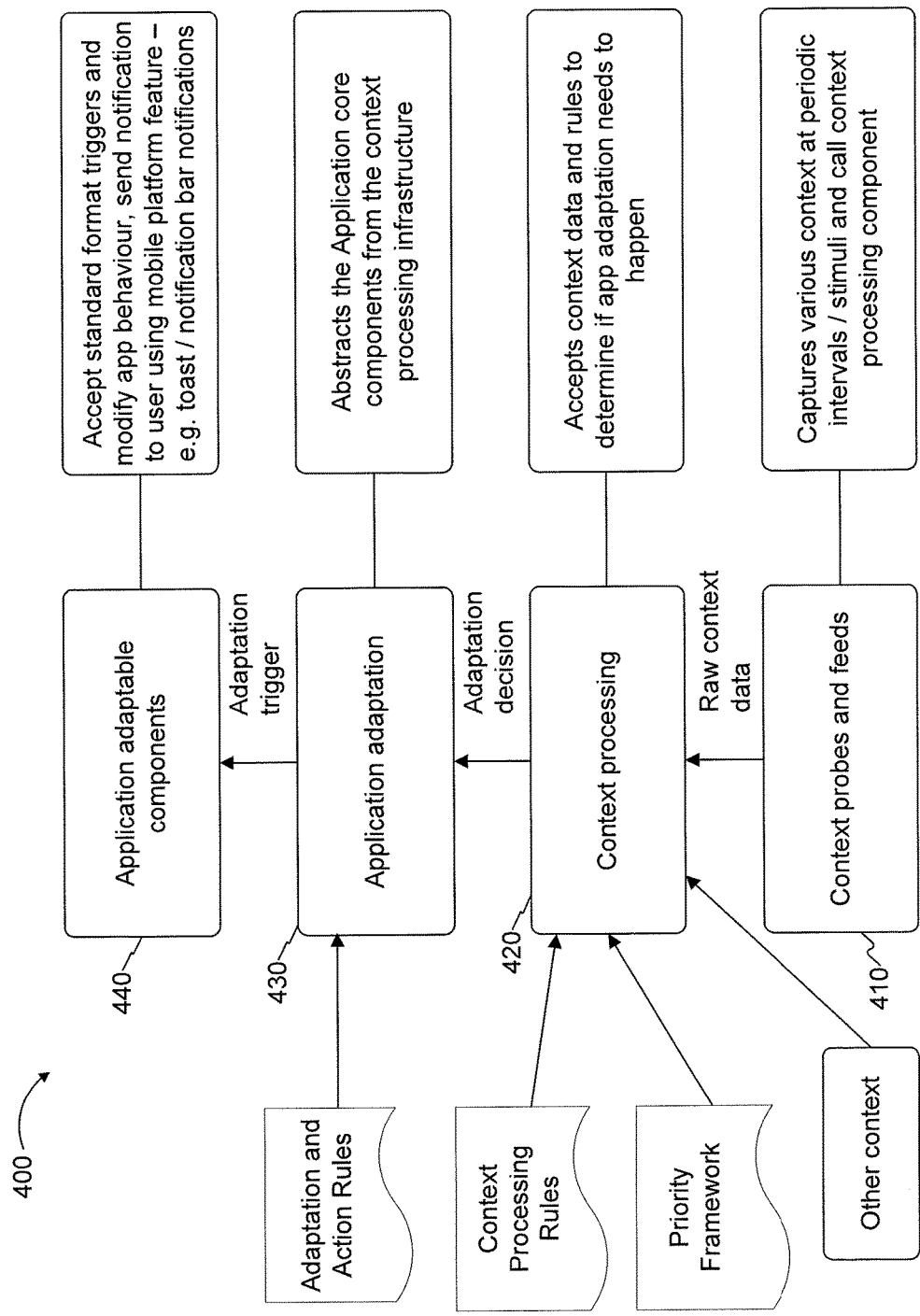
FIG. 4 is an illustration of an exemplary method according to embodiments of the disclosure.

FIG. 4 illustrates an exemplary method 400 for providing an adaptive architecture for a mobile application based on rich application, process, and resource contexts that may be deployed in resource constrained environments.

In step 410, the mobile device may receive data from context probes and feeds. Data from context probes and feeds may be sensor data from sensors similar to sensors 120 in FIG. 1. The data may be captured at a specified sampling frequency, or may be captured based on events or triggers. The data may be processed into raw context data.

In step 415, the mobile device may receive other context. The other context may include, for example, an application context and a process context. The mobile device may receive one or more other contexts from an external source, or from an analysis of applications and processes running on the mobile device.

In step 420, the raw context data and other context may undergo context processing. The context processing may be according to context processing rules and a priority framework provided to the mobile device. Based on the context processing rules and the priority framework, the mobile device may determine whether adaptation of the execution of the application may be desired or required. The adaptation decision may include determining what to execute, where to execute, or whether settings should be updated. The decision what to execute may include determining a specific function or backup that may be executed. The decision where to execute may determine whether to execute processing on the mobile device or on the backend servers or cloud. The decision whether settings should be updated may include determining whether device settings, sensors, or other applications should be modified. For example, the decision whether settings should be updated may include determining that Bluetooth should be turned on/off.

The adaptation decisions may be prioritized, ignored, or superseded based on the priority framework. For example, conflict rules in the priority framework may dictate that a decision to turn off Bluetooth be superseded by a decision to turn on Bluetooth. In one embodiment, the priority framework may assign a capability-limiting tag so that, e.g., a decision to turn off Bluetooth may be ignored if an application having a higher priority is currently using Bluetooth.

The adaptation decision from step 420 may then be used in step 430 of the method 400. In step 430, if the adaptation decision is that adaptation of the execution of the application is desired or required, the mobile device may abstract the application core components from the context-processing infrastructure of the mobile device. One or more adaptation triggers may then be activated or sent. The adaptation triggers are described in greater detail below with respect to FIG. 5.

If, however, the adaptation decision is that no adaptation of the execution of the application is desired or required, or if no adaptation decision was defined in step 420, operation of the method may end without adapting the execution of the application.

In step 440, the execution of the application may be modified or adapted based on the adaptation trigger generated in step 430. A user of the mobile device may be notified that the application's behavior has been modified. The notification may be one of known notifications such as notification bar notifications, toasts, and pop-up notifications.

FIG. 5 is an exemplary chart 500 illustrating different adaptation triggers that may be used in an exemplary healthcare application. FIG. 5 includes columns for the adaptation trigger type, the context-processing rule associated with the adaptation trigger type, and the adaptation decision.

The first adaptation trigger type represented in FIG. 5 is collaboration channel selection 510. The associated context processing rule and adaptation decision is that when (1) network-availability=true; AND (2) network-conn-type=EDGE; AND (3) application-objective=consultation; AND (4) doctor-availability=true; then set up an audio-chat session. That is, if there is network availability, and the network connection is an EDGE connection, and the application context is "consultation", and a doctor is available, then an audio-chat session will be set up.

The second adaptation trigger type represented in FIG. 5 is resource conservation 520. FIG. 5 illustrates four context-processing rules and associated adaptation decisions based on those context-processing rules. First, if the application context or objective is "diagnosis", then the adaptation decision is to terminate all network connections. Second, if the remaining battery availability is less than 30%, and the application objective is "consultation", then the adaptation decision is to override the application objective and set the application objective to "diagnosis". Third, if the battery availability is less than 50%, the adaptation decision is to throttle the CPU to 700 MHZ. Fourth, if the tradeoff is community coverage, and battery availability is less than 70%, and the application context is not "emergency", then the adaptation decision is to terminate 3G/wiFi and disable video conferencing features.

It should be noted that, although the above example may refer to only a single application running on the mobile device, in practice several applications may be running on the mobile device. Each of the different applications may have different requirements or requested actions based on adaptation decisions. When more than one application is running on the mobile device, and the adaptation decisions are conflicting or overlapping, the mobile device may prioritize the applications or adaptation decisions. In one embodiment, the context-processing rules may include conflict rules based on a priority framework.

For example, a mobile device may be running a healthcare application and a smart-energy application. The healthcare application may have set up an audio chat session for a consultation. The smart-energy application, however, may determine that battery power should be saved by terminating all of the network connections. In this case, a priority framework may include a rule that applications that are actively using a resource or peripheral such as the network connection have priority over applications that are not using the resource, but only seek to disable the resource. Based on this priority framework, the smart-energy application would not generate the adaptation decision to terminate the network connections because the context processing rules, including the priority framework, would determine that the healthcare application is actively using the network connection.

Other priority frameworks may be defined based on the particular needs of the applications running on the mobile device. For example, a situation may arise where one application specifically needs a peripheral to be turned off where that peripheral may interfere with the operation of another peripheral, while another application may specifically need the peripheral to be turned on. In this case, the priority framework may define a priority of one of the applications over the other, and the adaptation decision may be made accordingly.

The third adaptation trigger type represented in FIG. 5 is diagnostic confidence 530. If the diagnosis probability or confidence is less than 60%, and a network is available, and the network is an EDGE network, then the adaptation decision is to send the symptoms and context data to an online diagnostic server and initiate a diagnostic job with the online server. In this scenario, the healthcare application running on the mobile device may have a preliminary or reduced diagnostic capability on the mobile device due to the limited resources of the mobile device. Thus, an initial diagnostic may be performed on the mobile device, and a diagnostic confidence may also be determined. If the diagnostic confidence is high, for example, higher than 60%, the healthcare application may accept the diagnosis and act accordingly. For example, the healthcare application may notify the user of the diagnosis, and also send the diagnosis or a notification of the diagnosis over the network to a nearby medical professional. However, if the diagnostic confidence after the initial diagnosis performed on the mobile device is low, for example, less than 60%, then the healthcare application may send the symptoms and context data to the online diagnostic server. The online diagnostic server may then run a more complex or complete diagnosis and analysis of the symptoms and context data making use of the greater processing power and resources of the server compared to the mobile device.

The fourth adaptation trigger type represented in FIG. 5 is application configuration 540. If the mobile device does not have video capabilities, the adaptation decision is to disable video conferencing features in the healthcare application.

The fifth adaptation trigger type represented in FIG. 5 is infrastructure interaction 550. If a network is available, and the network connection is an EDGE connection, and more than 70% of the battery remains, and it has been more than a week since the last sync of the rules, then the adaptation decision is to trigger a synchronization of the mobile device with the healthcare application server and update the rules.

The sixth adaptation trigger type represented in FIG. 5 is high availability/graceful degradation. If the available battery is below 20%, and a network is available, and the transaction at issue is a long-running transaction, then the adaptation decision is to copy a checkpoint of the code and data and to send the copy to the backend server to resume the transaction.

Figure 6:
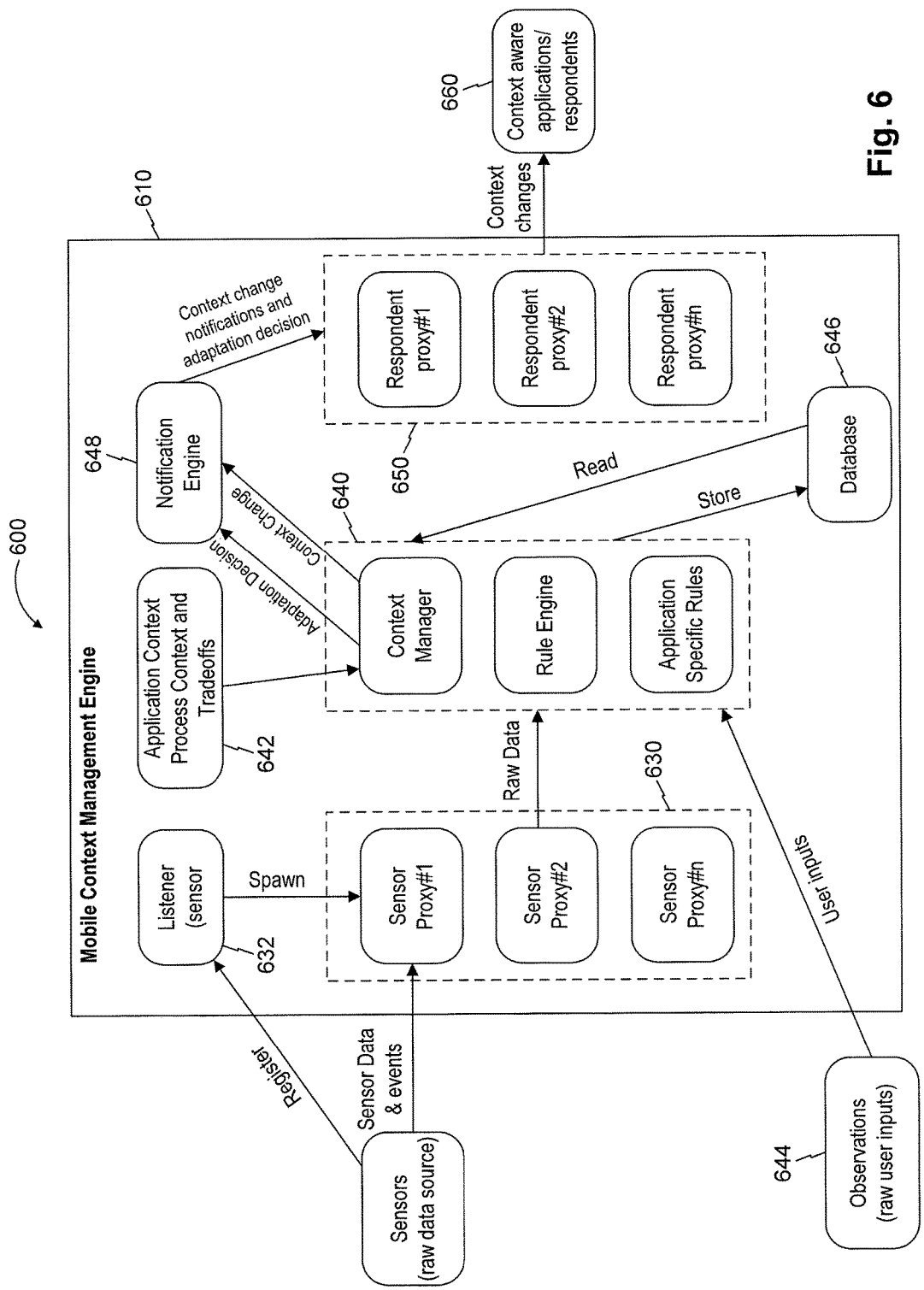
FIG. 6 is an illustration of a system according to embodiments of the disclosure.

FIG. 6 is an illustration of a system 600 for an adaptive architecture for a mobile application based on rich application, process, and resource contexts that may be deployed in resource constrained environments, according to an embodiment of the disclosure.

The system 600 may include a mobile context management system 610. The mobile context management system 610 may be part of a mobile device. The mobile context management system 610 may be embodied in hardware on the mobile device. In another embodiment, the mobile context management system 610 may be embodied in software stored on a non-transitory computer-readable storage medium that, when executed by a processor, causes the mobile device to function as a mobile context management system.

The system 600 may also include sensors 620. The sensors 620 may provide sensor data and event data to sensor proxies 630. New sensors 620 may first register with listener 632. Listener 632 may then spawn a corresponding new sensor proxy for the new sensor.

The sensor proxies 630 may provide raw data to the context manager 640. The context manager 640 may receive application specific rules from a rule engine. The context manager 640 may also receive application context, process context, and tradeoffs 643, and user input 644. In one embodiment, the context manager may monitor the mobile device to determine the application and process contexts as applications are executed on the mobile device.

The context manager 640 may determine contexts from the raw data, application specific rules, application context, process context, tradeoffs, and user input. The context manager 640 may store the context in a database 646. The context manager 640 may also retrieve context information from the database 646. The context manager 640 may also generate adaptation decisions based on the input data, store the adaptation decisions in the database 646, and read stored adaptation decision data from the database 646.

The context manager 640 may notify a notification engine 648 when the context changes and provide relevant adaptation decisions. The context manager 640 may also execute appropriate policies from a framework based on preset priorities. The notification engine 648 may then generate a context change notification. The context change notification may be provided to respondent proxies 650. The adaptation decision may also be provided to the notification engine 648, and may then provided to the respondent proxies 650. In another embodiment, the adaptation decision may be provided directly from the context manager 640 to the respondent proxies 650. The respondent proxies 650 may forward context change notifications to any interested external components, for example, to context aware applications or respondents 660.

Figure 7:
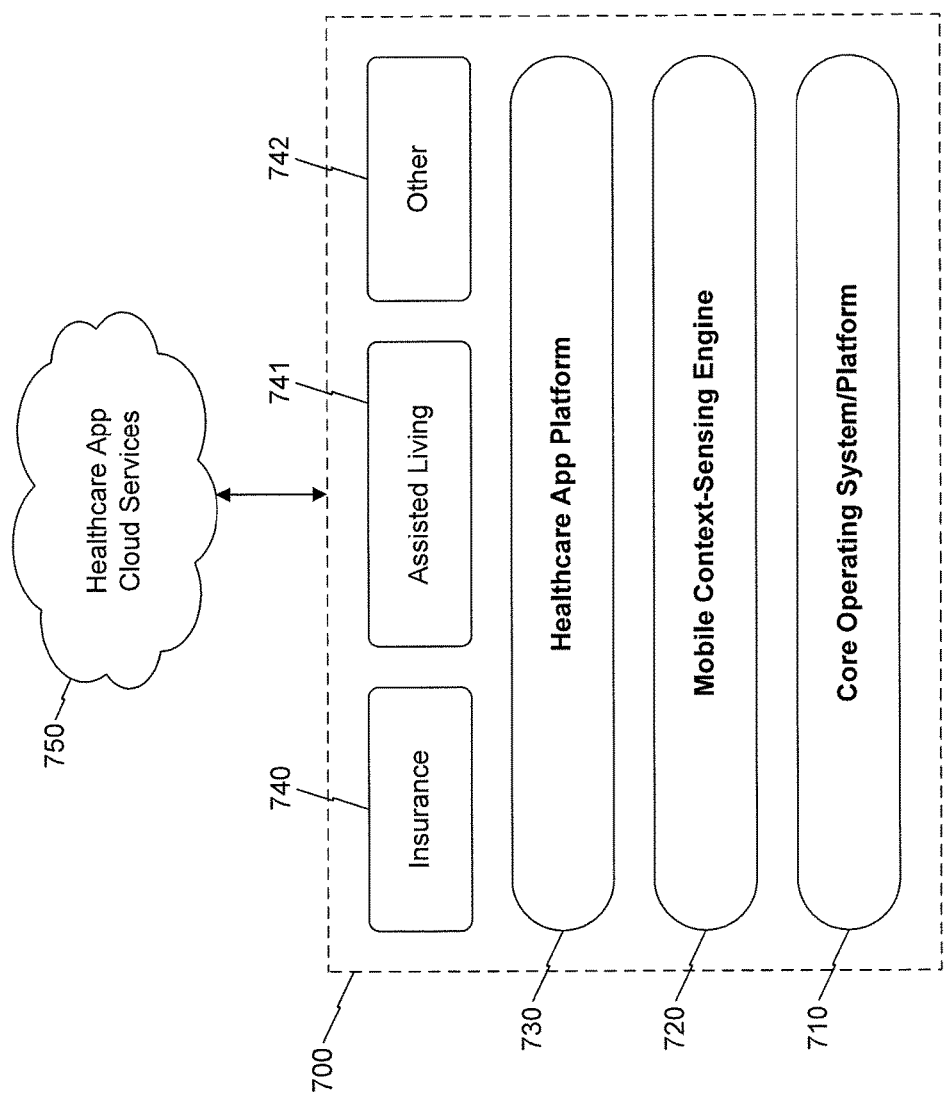
FIG. 7 is an illustration of an application stack according to embodiments of the disclosure.

FIG. 7 is an illustration of an application stack 700 of an exemplary embodiment of the disclosure. The application stack includes a core operating system or platform 710. The platform may include known platforms for mobile devices, such as an Android platform. The application stack 700 may also include a mobile context-sensing engine 720, similar to the mobile context management engine 610 in FIG. 6. The application stack may also include one or more applications 730. In the exemplary embodiment of FIG. 7, the application 730 may be a mobile healthcare application ("healthcare app"). The healthcare app may be a platform including several programs included in the application stack 700, such as an insurance component 740, an assisted living component 741, and other components 742. The application stack 700 may communicate with the healthcare app cloud services 750.

The mobile context-sensing engine 720 may be between the operating system 710 and the application 730, and may provide triggers to the application 730 based on the application context, process context, and other context data.

In some embodiments, when multiple applications or processes are running on the mobile device, or when multiple context processing rules are created, there may be conflicts between the rules. An example of conflicting rules is where resource conservation decisions conflict with other decisions. If the first adaptation trigger type is resource conservation and the application objective is diagnosis, the adaptation decision may be to terminate all of the network connections. If the second adaptation trigger type is infrastructure interaction and a network is available, the network connection is an EDGE connection, more than 70% of the battery remains, and it has been more than a week since the last sync of the rules, then the adaptation decision may be to trigger a synchronization of the mobile device with the healthcare application server and update the rules. However, because the resource conservation trigger will terminate the network connections, the synchronization and rules update will never occur while the application context is diagnosis, if the priority framework is static and prioritizes resource conservation over infrastructure interaction. This situation may be referred to as a capability-limiting conflict. In one embodiment, the adaptation decisions may include a capability-limiting tag that may indicate whether the adaptation decision may limit the capability of other adaptation decisions.

Figure 8:
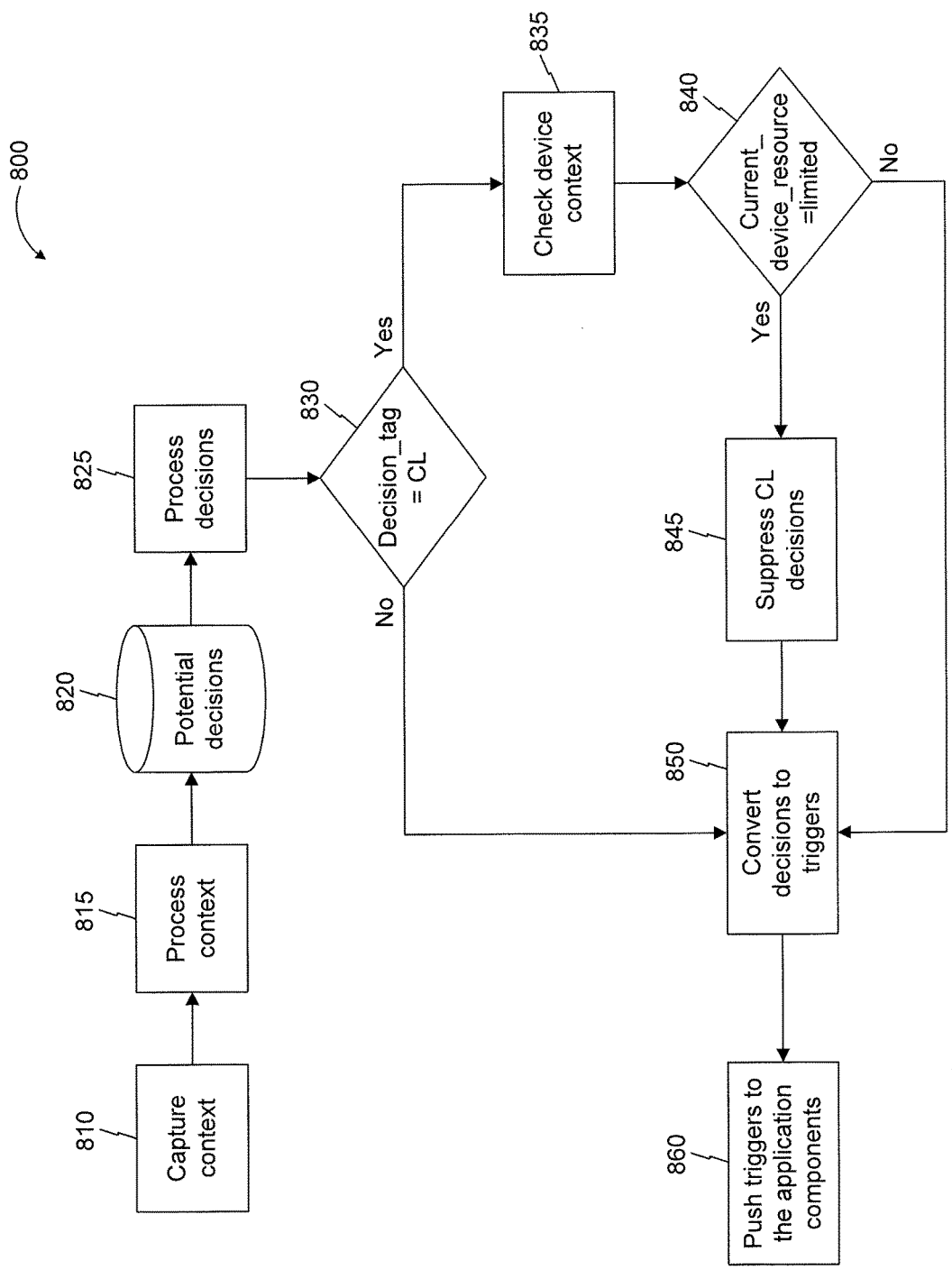
FIG. 8 is an exemplary flow diagram of a process for prioritizing context processing rules using a capability-limiting tag according to embodiments of the disclosure.

FIG. 8 is an exemplary flow diagram of a process 800 for prioritizing context-processing rules using the capability-limiting tag. In steps 810 and 815, context is captured and processed. In step 820, potential decisions are identified based on the processed context. In step 825, the decisions are processed. In step 830, the decisions are reviewed to determine whether the decisions include a capability-limiting tag. In this example, one of the decisions may be to terminate network connections based on the adaptation trigger resource conservation when the application context is diagnosis. This decision may be tagged as capability-limiting. In step 830, because this decision is capability-limiting, the method proceeds to step 835, where the device context is checked. In step 840, if the current device resource is limited, the capability-limiting decision may be suppressed in step 845. Any remaining decisions may be converted to triggers in step 850.

If, however, the current device resource would not be limited by the capability-limiting decision, the method may skip step 845 and proceed from step 840 to step 850 where the decision may be converted into appropriate triggers.

If, in step 830, the decision does not include a capability-limiting tag, operation of the method may proceed to step 850, where the decision is converted to appropriate triggers.

The process 800 illustrated in FIG. 8 may be performed for multiple potential decisions that may be generated from applications running on the mobile device. For example, three decisions may be pending, and each of the decisions may be processed to determine whether the decision is capability-limiting. If, for example, one of the decisions is capability-limiting, while the other two are not, the two decisions that are not capability-limiting may be converted to triggers, while the capability-limiting decision may be suppressed or not converted.

After converting the decisions to triggers in step 850, the triggers may be pushed to appropriate application components for adaptation of the applications in accordance with the triggers.

Figure 9:
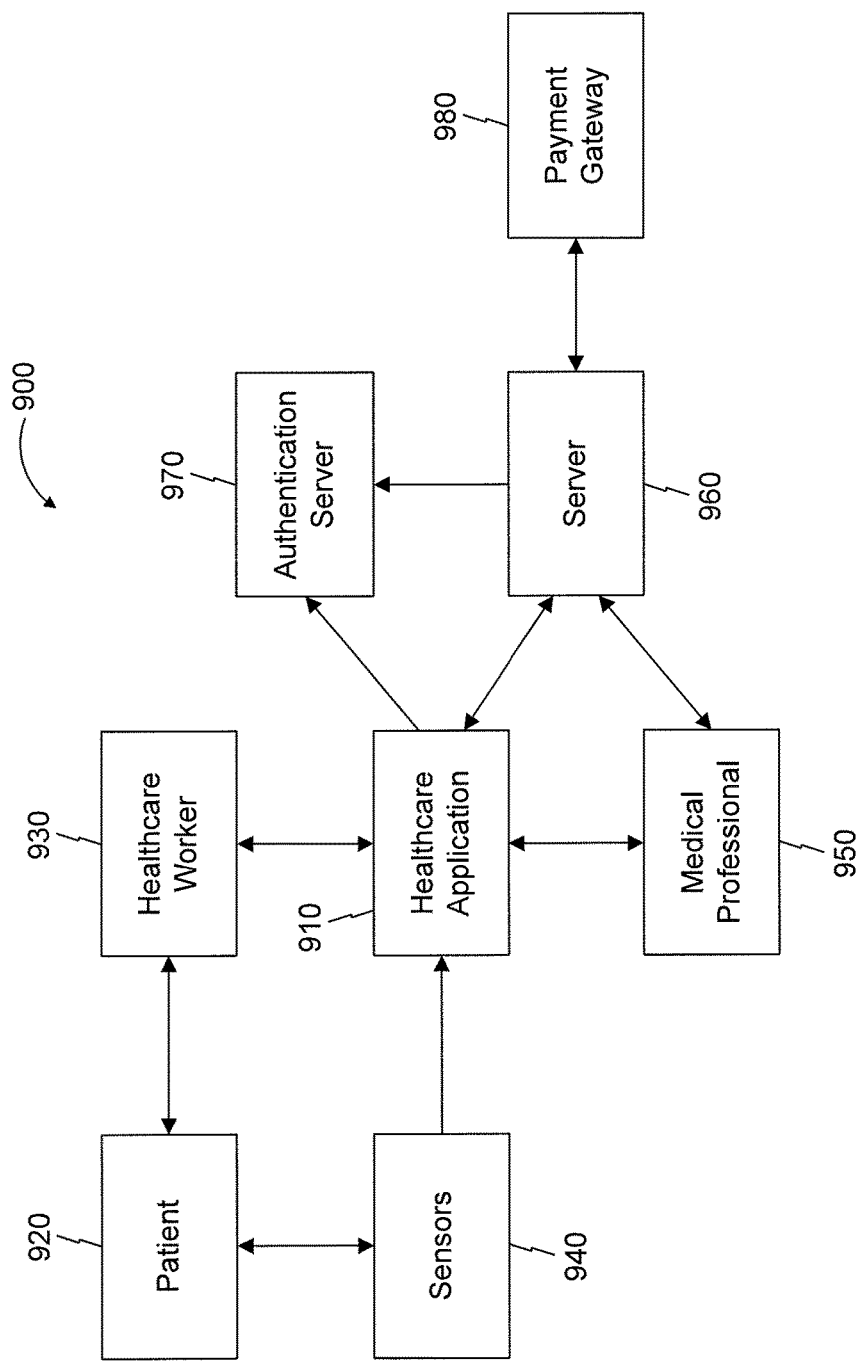
FIG. 9 is an illustration of an exemplary healthcare application system according to embodiments of the disclosure.

FIG. 9 is an illustration of an exemplary system 900 using a healthcare application 910 according to an embodiment of the disclosure. The healthcare application may be the iDOC application. The healthcare application 910 may be running on a mobile device used by a healthcare worker 930. The healthcare worked may be monitoring or assisting a patient 920. The patient 920 may be in a hospital, at home, or in any other location. The healthcare worker 930 may ask the patient 920 health related questions and may make observations of the patient 920. The healthcare worker 930 may enter data into the healthcare application 910. Sensors 940 may also gather information about the patient 920, as well as other context information about the patient, as well as the mobile device running the healthcare application 910. The information gathered by the sensors 940 may include physiological information, environmental information, spatial information, temporal information, battery level information, connectivity availability and type information, application information, and process information. This information may be provided to a context manager which may process the information into context that is provided to the healthcare application 910.

The healthcare application 910 may also have video and/or audio chat capabilities that allow the healthcare application 910 to communication with a medical professional 950. The healthcare application 910 may also be able communicate with one or more servers, for example, a server 960 or an authentication server 970. The server 960 may include installation files for the healthcare application 910 and rule updates for the healthcare application 910, and may perform analysis of data relating to the healthcare application 910. The system 900 may also include a payment gateway 980 to facilitate payment for services.

An example of operation of the system 900 may include a diagnosis function of the healthcare application. When the healthcare application 910 is running a diagnosis, the healthcare application 910 may gather information from the healthcare worker 930 and the sensors 940. The information may include an application context of "diagnosis". The healthcare application 910 may run a preliminary diagnostic on the mobile device to determine a diagnostic confidence level. The process context for this process may be "diagnostic confidence". Based on the application context, process context, and other contexts, the healthcare application 910 may generate one or more adaptation triggers. For example, if the diagnostic confidence is low and the network connection type is EDGE, an adaptation decision to send the symptoms and context data to the server 960 for diagnosis and a corresponding trigger may be generated. Based on the trigger, the healthcare application 910 may shift the diagnostic processing to the server 960, which may have substantially greater processing power and resources, and thus may be able to provide a much more accurate diagnosis.

Figure 10:
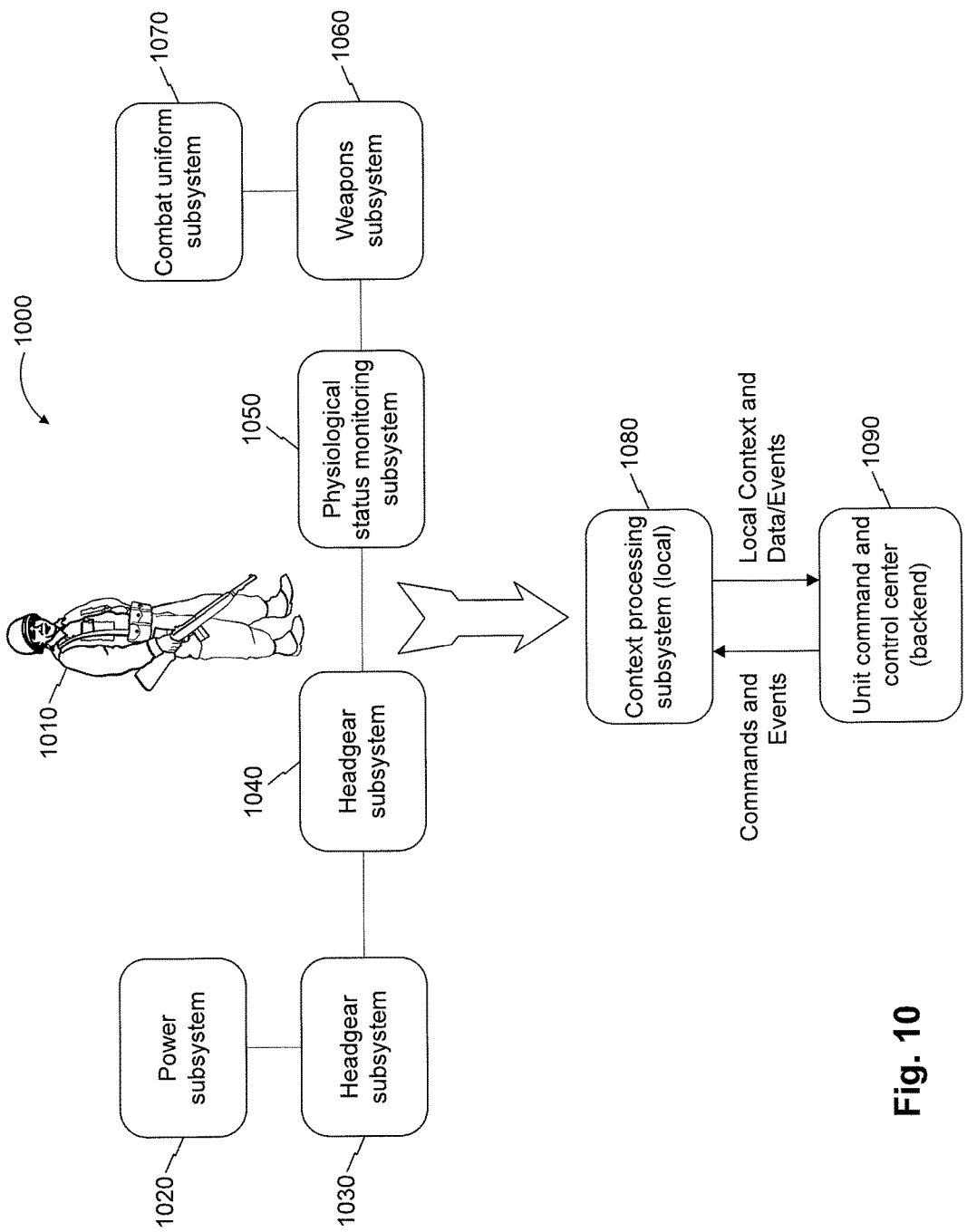
FIG. 10 is an illustration of an exemplary networked soldier application system according to embodiments of the disclosure.

FIG. 10 is an illustration of an exemplary system 1000 in which principles of the disclosure may be used in connection with a networked soldier 1010. The networked soldier 1010 may carry a mobile device. The mobile device may include several sub-systems running on the device. For example, the mobile device may be running a power subsystem 1020, a headgear subsystem 1030, a microclimate cooling subsystem 1040, a physiological status monitoring subsystem 1050, a weapons subsystem 1060, and a combat uniform subsystem 1070. Each of these subsystems provides data to a mobile context processor on the mobile device. The data may be processed in a context processing subsystem 1080 of the mobile device. Processing all of the data provided to the mobile context processor, however, may quickly use up system resources of the mobile device. When the system resources of the mobile device are constrained, the mobile device may determine, based on application context, process context, tradeoffs, and other context, which components or functionality to run in the local system, and which will be shifted or transferred from the mobile device to a remote command control unit 1090 that acts as a backend server.

In the networked soldier example illustrated in FIG. 10, an application context for an application running on the mobile device may be "keep the soldier safe and alive". As part of the soldier's duties, the soldier may be required to photograph high-value enemy targets that have been eliminated and match them with a target profile. Because light and combat conditions may make it difficult to obtain a high-quality photograph, the local processing engine 1080 on the mobile device may not be able to identify or match the target. In this case, the process context may be "photograph quality poor, unable to process locally". Although ideally a fast response from the mobile device is required, because of the process context, the next best option may be to shift or transfer the photograph processing to the unit command center 1090. Thus, the "processing photograph" functionality may be dynamically moved from the local processor to the backend server in response to a trigger.

In another instance of the example illustrated in FIG. 10, the local processing engine 1080 may be capable of processing the photograph and matching the target. However, tradeoffs provided to the local processing engine 1080 may prioritize the safety of the soldier over the processing of the photograph. Thus, if a process relating to the soldier's safety is consuming a large portion of the mobile device's resources, the local processing engine 1080 may still decide to offload the photograph processing to the command center 1090 based on the tradeoffs.

Although described above with reference to examples of healthcare and networked soldier applications, the disclosed systems and methods for an adaptive architecture for a mobile application based on rich application, process, and resource contexts that may be deployed in resource constrained environments may be applicable to other types of applications in various fields. For example, the disclosed systems and methods could be used with applications for monitoring energy usage and efficiency in a house, monitoring road and driving conditions, or any other applications where an adaptive architecture for a mobile application based on application, process, and resource contexts may be applicable.

Other embodiments of the invention will be apparent to those skilled in the art from consideration of the specification and practice of embodiments of the disclosure as disclosed herein. It is intended that the specification and examples be considered as exemplary only, with a true scope and spirit of the invention being indicated by the following claims.

What is claimed is:

1. A method comprising:
combining, by a processor of a device, a first context, a second context, and a third context to create a particular context,
the first context identifying a context of an application running on the device,
the second context identifying a context of a process running on the device, and
the third context identifying a context derived from one or more other devices that are external to the device;
determining, by the processor, information relating to execution of the application on the device based on the particular context,
the information relating to the execution of the application including an indication as to whether to modify one or more sensors of the device;
prioritizing, by the processor, the information, relating to the execution of the application on the device, over other information relating to the execution of the application on the device based on:
priority information associated with a priority framework, and
tradeoff rules associated with the information, relating to the execution of the application on the device, and the other information; and
adapting, by the processor and based on prioritizing the information relating to the execution of the application on the device, the execution of the application on the device.

2. The method of claim 1, where determining the information relating to the execution of the application on the device includes:
determining a particular function to be executed.

3. The method of claim 1, where determining the information relating to the execution of the application on the device includes:
determining that the execution of the application is to be performed on the device, on a server, or in a cloud environment.

4. The method of claim 1, further comprising:
transmitting, to a server, a copy of a checkpoint of code of the application,
the execution of the application of the device being based on the checkpoint.

5. The method of claim 1, further comprising:
shifting a portion of a processing load of the application to a server.

6. The method of claim 5, where shifting the portion of the processing load includes:
shifting the portion of the processing load to at least one of:
free up processing power of the device,
save battery power of the device, or
increase a speed of processing the application.

7. The method of claim 1, where adapting the execution of the application on the device includes:
adapting the execution of the application on the device based on one or more adaptation triggers,
the one or more adaptation triggers being based on network availability, battery availability, and an objective relating to the application.

8. The method of claim 1, further comprising:
providing, to a user of the device, a notification regarding adapting the execution of the application.

9. A non-transitory computer-readable storage medium storing instructions, the instructions comprising:
one or more instructions which, when executed by a processor of a device, cause the processor to:
combine a first context, a second context, and a third context to create a particular context,
the first context identifying a context of an application running on the device,
the second context identifying a context of a process running on the device, and
the third context identifying a context derived from one or more other devices that are external to the device;
determine information relating to execution of the application on the device based on the particular context,
the information relating to the execution of the application on the device including an indication as to whether to modify one or more sensors of the device;
prioritize the information, relating to the execution of the application on the device, over other information relating to the execution of the application on the device based on:
priority information associated with a priority framework, and
tradeoff rules associated with the information, relating to the execution of the application on the device, and the other information; and
adapt, based on prioritizing the information relating to the execution of the application on the device, the execution of the application on the device.

10. The non-transitory computer-readable storage medium of claim 9, where the one or more instructions to determine the information relating to the execution of the application on the device include:
one or more instructions to determine a particular function to be executed.

11. The non-transitory computer-readable storage medium of claim 9, where the one or more instructions to determine the information relating to the execution of the application on the device include:
one or more instructions to determine that the execution of the application is to be performed on the device, on a server, or in a cloud environment.

12. The non-transitory computer-readable storage medium of claim 9, where the one or more instructions further include:
one or more instructions to transmit, to a server, a copy of a checkpoint of code of the application,
the execution of the application on the device being based on the checkpoint.

13. The non-transitory computer-readable storage medium of claim 9, where the one or more instructions further include:
one or more instructions to shift a portion of a processing load of the application to a server.

14. The non-transitory computer-readable storage medium of claim 13, where the one or more instructions to shift the portion of the processing load include:
one or more instructions to shift the portion of the processing load to at least one of:
free up processing power of the device,
save battery power of the device, or
increase a speed of processing the application.

15. The non-transitory computer-readable storage medium of claim 9, where the one or more instructions to adapt the execution of the application on the device include:
one or more instructions to adapt the execution of the application on the device based on one or more adaptation triggers,
the one or more adaptation triggers being based on network availability, battery availability, and an objective relating to the application.

16. The non-transitory computer-readable storage medium of claim 9, where the one or more instructions further comprise:
one or more instructions to provide, to a user of the device, a notification regarding adapting the execution of the application.

17. A system comprising:
a device to:
combine a first context, a second context, and a third context to create a particular context,
the first context identifying a context of an application running on the device,
the second context identifying a context of a process running on the device, and
the third context identifying a context derived from one or more other devices that are external to the device;
generate information relating to execution of the application on the device based on the particular context,
the information relating to the execution of the application on the device including an indication as to whether to modify one or more sensors of the device;
prioritize the information, relating to the execution of the application on the device, over other information relating to the execution of the application on the device based on:
priority information associated with a priority framework, and
tradeoff rules associated with the information, relating to the execution of the application on the device, and the other information; and
adapt, based on prioritizing the information relating to the execution of the application on the device, the execution of the application on the device.

18. The system of claim 17, where, when determining the information relating to the execution of the application on the device, the device is to at least one of:
determine a particular function to be executed; or
determine that the execution of the application is to be performed on the device, on a server, or in a cloud environment.

19. The system of claim 17, where the device is further to:
shift a portion of a processing load of the application to a server.

20. The system of claim 17, where, when adapting the execution of the application on the device, the device is to:
adapt the execution of the application on the device based on one or more adaptation triggers,
the one or more adaptation triggers being based on network availability, battery availability, and an objective relating to the application.

* * * * *